(12) United States Patent
Omran et al.

(10) Patent No.: US 12,368,008 B1
(45) Date of Patent: Jul. 22, 2025

(54) NANOCOMPOSITE-BASED SUPERCAPACITORS FOR ENERGY STORAGE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/072,973

(22) Filed: Mar. 6, 2025

(51) Int. Cl.
    *H01G 11/32*     (2013.01)
    *H02J 7/34*     (2006.01)

(52) U.S. Cl.
    CPC ............. *H01G 11/32* (2013.01); *H02J 7/345* (2013.01); *H02J 2207/50* (2020.01)

(58) Field of Classification Search
    CPC ....... H01G 11/32; H02J 7/345; H02J 2207/50
    USPC .......................................................... 320/167
    See application file for complete search history.

(56) References Cited

U.S. PATENT DOCUMENTS

| | | | | |
|---|---|---|---|---|
| 7,948,739 B2 * | 5/2011 | Zhamu | ................... | H01G 11/36 361/519 |
| 8,334,079 B2 * | 12/2012 | Strutt | ................... | H01M 8/1016 429/480 |
| 9,013,860 B2 * | 4/2015 | Chen | ................... | H01G 11/22 361/512 |
| 2013/0168228 A1 * | 7/2013 | Ozin | ................... | B01J 37/0215 977/773 |
| 2013/0170098 A1 * | 7/2013 | Chen | ................... | H01G 11/36 977/762 |
| 2017/0241747 A1 * | 8/2017 | Ganor | ................... | B32B 5/18 |
| 2017/0354962 A1 | 12/2017 | D'Souza et al. | | |
| 2018/0366280 A1 * | 12/2018 | Hwang | ................. | H01M 4/583 |

FOREIGN PATENT DOCUMENTS

CN             112774714 A      5/2021

OTHER PUBLICATIONS

D. Keerthi Devi, M. Manisha, N. Venkatesham, Sridarala Ramu, Avula Edukondalu, Bandi Vittal Prasad, Enhanced electrochemical properties of V2O5 and g-C3N4-V2O5 nanocomposites for rechargeable battery systems, Journal of the Indian Chemical Society, vol. 102, Issue 3, (Year: 2025).*

(Continued)

*Primary Examiner* — M Baye Diao
(74) *Attorney, Agent, or Firm* — Oblon, McClelland, Maier & Neustadt, L.L.P.

(57) ABSTRACT

A method of storing electrical charge may include charging a capacitor, including an anode and/or a cathode layer further including nanocomposite having graphitic $C_3N_4$, $V_2O_5$, and $MgAl_2O_4$ in a mass relationship to each other in a range of 5 to 15:2 to 7:75 to 95, with alternating current at a frequency in a range of from 1 megahertz (MHz) to 12 MHz.

20 Claims, 7 Drawing Sheets

(56) References Cited

OTHER PUBLICATIONS

Yaju Zhou, et.al., "Preparation of 3D porous g-C3N4@V2O5 composite electrode via simple calcination and chemical precipitation for supercapacitors", Journal of Alloys and Compounds, vol. 817, Oct. 17, 2019, 152707, 7 pages.
Lei Han, et.al., "Fabrication of porous MgAl2O4 ceramics using V2O5 as sintering additive", Ceramics International, vol. 46, Issue 14, Jun. 10, 2020, pp. 22819-22825, 7 pages.
Yong-Ping Gao, et.al., "Cycling profile of layered MgAl2O4/reduced graphene oxide composite for asymmetrical supercapacitor", Journal of Colloid and Interface Science, vol. 539, Dec. 12, 2018, pp. 38-44, 7 pages.
Dipanwita Majumdar, et.al., "V2O5 and its Carbon-Based Nanocomposites for Supercapacitor Applications", ChemElectroChem, vol. 6. 2019, pp. 1623-1648.

\* cited by examiner

NANOCOMPOSITE-BASED SUPERCAPACITORS FOR ENERGY STORAGE

BACKGROUND

Technical Field

The present disclosure is directed towards nanocomposites for storing electrical energy and, more particularly, relates to a method of storing electrical charge using a nanocomposite including graphitic $C_3N_4$, $V_2O_5$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The increasing global population and demand for energy have resulted in energy crises and environmental concerns such as global warming. Currently, energy is predominantly obtained from non-renewable sources like fossil fuels, which are economically taxing and further contribute significantly to environmental pollution and depletion of energy reserves, as described by Imtiaz and colleagues in *Diamond Rel. Mater.* 2024, 145, 111110, which is incorporated by reference herein. Consequently, researchers have been focusing on finding alternative renewable energy sources that are sustainable and environmentally friendly, such as solar and wind energy. However, certain renewable energy sources are dependent on weather conditions, which necessitates the development of efficient energy storage systems to ensure consistent energy availability.

In order to address energy storage challenges, various energy storage technologies such as supercapacitors (SCs), fuel cells, and lithium-ion (Li-ion) batteries have been developed. Among these, SCs are considered favorable since SCs include certain desirable characteristics such as, low cost, eco-friendliness, longer cyclic life, high specific energy (E), and high specific power. Compared to conventional batteries, SCs offer superior capacitance and rapid charging/discharging capabilities. SCs play a crucial role in energy storage devices across multiple applications. SCs are classified into two major categories based on charge storage mechanisms: pseudo-capacitors (PCs) and electric double-layer capacitors (EDLCs). Recent developments have led to the emergence of hybrid SCs, which combine the properties of both EDLCs and PCs, utilizing materials such as carbon-based substances and transition metal oxides/chalcogenides. Among the promising electrode materials, transition metal oxides with various oxidation states and spinel structures have been identified as highly effective for catalysts, SCs, and Li-ion batteries due to enhanced redox properties of transition metal oxides. The spinel phase, represented by the general formula $AB_2O_4$, includes a combination of one divalent cation ($A^{2+}$) and two trivalent cations ($B^{3+}$), as described by Sickafus, et al.; in *J. Am. Ceram. Soc.* 1999, 82(12), 3279-3292, and Wyckoff in Crystal Structures Vol. 2, $2^{nd}$ Ed. Wiley Interscience, New York: 1964, each of which is incorporated by reference herein. In general, a unit cell of the spinel structure includes a face-centered cubic arrangement of oxygen ions, hosting 32 O ions, 64 tetrahedral sites, and 32 octahedral sites which are occupied with $A^{2+}$ and $B^{3+}$ cations. When one half of the octahedral interstices are occupied by the $B^{3+}$ cations and one eighth of the tetrahedral sites are occupied by the $A^{2+}$ cations the spinel phase is called "normal." Whereas, when tetrahedral sites are occupied by half of the $B^{3+}$ and octahedral sites are occupied by the other half and $A^{2+}$ the spinel phase is called "inverse." An example of spinel-phase materials is magnesium aluminate ($MgAl_2O_4$), which exhibits exceptional properties such as high thermal stability (melting point of 2135° C.), high hardness (16 GPa), high mechanical resistance, chemical resistance, wide band gap energy, and relatively low thermal expansion coefficient within a broad temperature range of about 30° C. to 1400° C. The aforementioned properties make $MgAl_2O_4$ suitable for applications in metallurgical, electrochemical, radio-technical, and chemical industries.

Several methods have been developed for synthesizing the $MgAl_2O_4$ phase, including conventional solid-state reactions, sol-gel processing, spray drying, co-precipitation, microwave processing, hydrothermal techniques, and organic gel-assisted citrate complexation, as described by Ganesh et al. in *Ceram. Int.* 2005, 31, 67-74, Adak, et al. in *J. Mater. Sci. Lett.* 1997, 16, 234-235, Ryshekewitch, et al. in *Oxide Ceramics*, Academic Press, New York: 1960, and Kostic, et al. in *Ceramurgia Int.* 1977, 3, 57-60, each of which is incorporated by reference herein. Despite these advancements, studies on the electrical properties of $MgAl_2O_4$ remain limited. Evaluations conducted using AC impedance spectroscopy in a frequency range of 0.1 Hz to 10 kHz have revealed the impact of environmental factors such as relative humidity on the electrical behavior of the material.

Recent research efforts have explored the doping of $MgAl_2O_4$ with vanadium to enhance electrical and physical properties of $MgAl_2O_4$. Additionally, graphitic carbon nitride (g-$C_3N_4$) has gained significant attention as a metal-free photocatalyst due to high thermal and chemical stability, semiconductor properties, and optical features. Graphitic-$C_3N_4$ has shown potential for applications in hydrogen generation, pollutant decomposition, and energy storage devices, as described by Wang, et al. *Nature Mater.* 2009, 24, 1491-1498, and Su et al. in *J. Am. Chem. Soc.*, 2010, 132, 16299-16301, and Yan and colleagues in *Langmuir* 2010, 26, 3894-3910, each of which is incorporated by reference herein. When combined with $MgAl_2O_4$, the resulting composite materials exhibit improved electrochemical performance owing to increased active sites, enhanced electrical conductivity, and superior wettability.

Despite the promising properties of SCs and subsequent potential applications, several limitations hinder their adoption. Current synthesis methods often involve complex processes, high energy consumption, and expensive raw materials. Additionally, SCs typically suffer from low energy density compared to traditional batteries, making them less suitable for applications requiring prolonged energy storage. The dependence on specific environmental conditions, such as humidity and temperature, further complicates their practical implementation. Furthermore, the reduced surface area and electrical conductivity of stand-alone g-$C_3N_4$ limits the specific capacitance and overall electrochemical performance of the SCs. The combination of g-$C_3N_4$ with spinel-based materials has shown promise, however, challenges remain in achieving uniform dispersion and maintaining long-term stability under operational conditions.

Accordingly, one object of the present disclosure is to provide a method of electrical charge storage using nanohybrids that may circumvent the above listed drawbacks and limitations of the methods known in the art.

SUMMARY

In an exemplary embodiment, a method of storing electrical charge may include charging a capacitor, including an anode and/or a cathode layer further including nanocomposite having graphitic $C_3N_4$, $V_2O_5$, and $MgAl_2O_4$ in a mass relationship to each other in a range of 5 to 15:2 to 7:75 to 95, with alternating current at a frequency in a range of from 1 megahertz (MHz) to 12 MHz.

The average pore distribution of the nanocomposite may be unimodal. The Brunauer-Emmett-Teller (BET) specific surface area of the nanocomposite may be in a range of 25 $m^2/g$ to 75 $m^2/g$ (e.g., 43.3 $m^2/g$), and/or an average pore diameter of the nanocomposite, according to Barrett-Joyner-Halenda (BJH) measurement method, may be in a range of 1 nanometer (nm) to 10 nm (e.g., 5.66 nm), and/or an average pore volume of the nanocomposite, according to the BJH measurement method, may be in a range of from 0.01 $cm^3/g$ to 0.5 $cm^3/g$ (e.g., 0.105 $cm^3/g$).

The nanocomposite may have a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and/or a (620) spinel interplanar spacing in a range of from 0.090 to 0.170, according to selected area diffraction (SAED).

The mass relationship of the nanocomposite may be in a range of from 9 to 11:4 to 6:84 to 86, the nanocomposite may have a (111) spinel interplanar spacing of 0.260±2% nm, a (400) spinel interplanar spacing of 0.183±2% nm, a (220) interplanar spacing of 0.147±2% nm, and/or a (620) spinel interplanar spacing of 0.129±2% nm, according to selected area diffraction. Further, an X-ray diffraction (XRD) spectrum of the nanocomposite under Cu-filtered Cu-Kα radiation (1.5418 Å) powered at 45 kV and 10 mA may have 20 peaks of an $MgAl_2O_4$ spinel phase at 18.6±1°, 44.9±1°, 56.1 1°, 59.7±1°, and/or 74.7±1°, an MgO cubic phase at 37.0±1°, 62.6±1°, 75.7±1°, and/or 79.07±1°, an $Al_2O_3V_2O_5$ phase at 26.6±1°, 34.0±1°, 43.1±1°, and/or 64.9±1°, and/or g-$C_3N_4$-related diffractions at 67.2±1° and/or 79.0±1°. The $V_2O_5$ may be at least 95% dissolved within the $MgAl_2O_4$ spinel phase and g-$C_3N_4$ lattice, as detected in the XRD spectrum.

The charging may be at a frequency in a range of from 3 MHz to 12 MHz, the anode and/or a cathode layer including the nanocomposite, in operation, becomes an electric double-layer of conductor-rich grains separated by conductor-poor grain boundaries, and the anode and/or a cathode layer including the nanocomposite forms an array of homogeneous spherical metal oxides nanoparticles having an average largest diameter in a range of from 7.5 nm to 12.5 nm (e.g., 9.4 nm) on a porous structured layer including nanosheets and platelets of the g-$C_3N_4$.

The nanocomposite may include no more than 10 wt. % of $TiO_2$, relative to a total metal oxide weight.

The nanocomposite may include no more than 1 wt. % of AlN, relative to a total metal oxide weight.

The nanocomposite may include no more than 1 wt. % $SiO_2$, relative to a total metal oxide weight.

Relative to total carbon material weight, carbon materials in the nanocomposite may include no more than 1 wt. % carbon nanotubes, no more than 1 wt. % graphene oxide, and no more than 1 wt. % carbon dots.

The nanocomposite may include no more than 1 wt. % AgBr, relative to a total metal oxide weight.

The nanocomposite may include no more than 1 wt. % Co, relative to total nanocomposite weight.

The nanocomposite may include no more than 1 wt. % elemental state metal, relative to total nanocomposite weight.

The nanocomposite may include no more than 1 wt. %, individually or in combination, elemental state Co and/or Fe, relative to total nanocomposite weight.

The nanocomposite may include no more than 10 wt. % folic acid (or organic (di)acid), relative to total organic weight in the nanocomposite, and the nanocomposite may include no more than 2.5 wt. % Mo, relative to total nanocomposite weight.

The nanocomposite obtained may include no more than 1 wt. % carbonaceous material besides the graphitic carbon nitride, and carbon materials in the nanocomposite include no nanotubes, relative to total nanocomposite weight.

The nanocomposite may include no more than 10 wt. % $VO_4$, relative to total vanadium-oxide weight, and the nanocomposite may include no more than 1 wt. % V-doped ZnO, relative to total nanocomposite weight.

The nanocomposite may include no more than 10 wt. %, individually or in any combination, relative to total metal content, of any of Zn, Ce, Gd, La, Ba, Ti, Ca, Sr, Zr, Pb, Ni, Ag, Pt, Co, Cu, Mn, Cd, Ta, Nb, Pr, and Bi, and the nanocomposite may include no more than 1 wt. %, individually or in total/together in any combination, relative to total carrier weight, of $LiCoO_2$, $SiO_2$, $TiO_2$, ZnO, and/or ZnS.

The graphitic $C_3N_4$ in the nanocomposite may consist essentially of sheet morphologies, e.g., such that the BET surface area is not changed by more than 10% from a nanocomposite having only sheet morphologies. The graphitic $C_3N_4$ in the nanocomposite may include no more than inevitable traces of boron and no more than inevitable nitrogen vacancies.

The nanocomposite may have no more than 0.1 wt. %, individually or in combination, of $2MgO \cdot V_2O_5$ and $Na_2Ti_3O_7$, relative to total nanocomposite weight, and of the $V_2O_5$ present in the nanocomposite, no more than 0.1 wt. % may be in liquid phase.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
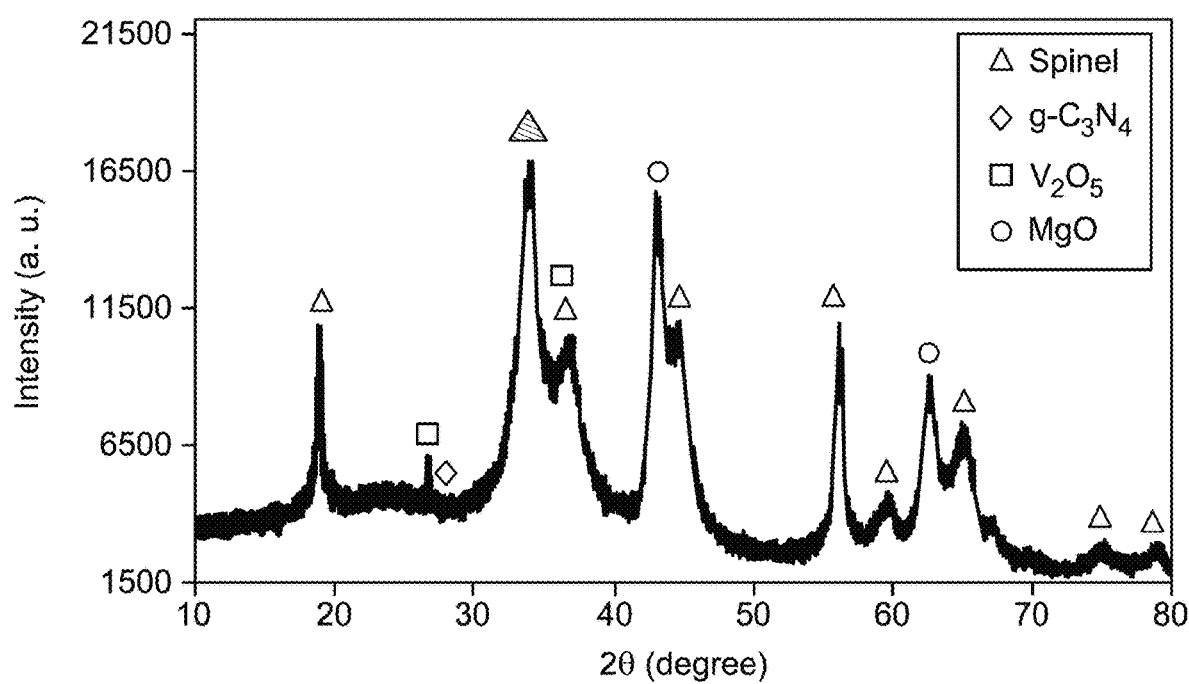
FIG. 1 is a graph depicting X-ray diffraction (XRD) patterns of an inventive 10% g-$C_3N_4$@$V_2O_5$/$MgAl_2O_4$ nanocomposite.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'electrical applications' refers to the use of electrical principles, devices, and systems in the transmission, distribution, control, or conversion of electrical energy or signals, including but not limited to power generation, storage, processing, and communication, such applications are designed to enhance efficiency, functionality, or performance in electronic, electrical, or energy-related systems.

As used herein, the term 'supercapacitor' refers to an energy storage device that stores electrical energy through the electrostatic separation of charge, employing high surface area electrodes and an electrolyte. The device is capable of rapid charge and discharge cycles, providing high power density compared to conventional capacitors, and exhibiting greater charge retention than typical batteries.

As used herein, the term 'energy storage' refers to the process or technology of capturing and storing energy for later use, typically involving the conversion of electrical energy into a form that can be retained and subsequently retrieved as needed. Such energy storage systems may include batteries, supercapacitors, and other devices that store energy in chemical, electrostatic, or other forms for efficient delivery on demand.

As used herein, the term 'anode' refers to the electrode in an electrical device, such as a battery, capacitor, or electrochemical cell, where oxidation occurs. It is the terminal through which current flows into the device from an external circuit in the case of discharging. For a battery, during discharge, the anode releases electrons that flow through the external circuit, while ions move within the device to balance the charge. In a capacitor, the anode is one of the two electrodes where charge is stored, typically paired with a cathode. The specific function of the anode depends on the device, but its primary role is always related to facilitating electron flow and maintaining charge balance during the electrochemical reaction.

As used herein, the term 'cathode' refers to the electrode in an electrical device, such as a battery, capacitor, or electrochemical cell, where reduction occurs. The cathode is the terminal through which current flows out of the device when it is discharging. During the discharge process in a battery, the cathode accepts electrons that flow through the external circuit from the anode, and the ions move within the device to balance the charge. In a capacitor, the cathode is one of the two electrodes where charge is stored, working in conjunction with the anode. The cathode is where the electrochemical reaction results in the gain of electrons, completing the electrical circuit and enabling energy storage or release.

As used herein, the term 'electric double-layer (EDL)' refers to a charge structure formed at the interface between a conductive electrode and an electrolyte. It consists of two layers: the inner layer, where ions are tightly adsorbed to the electrode surface with opposite charge, and the outer diffuse layer, where ions are loosely associated with the electrode. This double-layer configuration enables energy storage by separating charges at the electrode-electrolyte interface, which is fundamental to the operation of electrochemical devices like capacitors and supercapacitors.

As used herein, the term 'conductor-rich grains' refer to regions within a material where there is a high concentration of conductive elements or phases, typically metals or conductive compounds. These grains have enhanced electrical conductivity due to the abundance of charge carriers such as electrons. In the context of nanocomposites or electrode materials, conductor-rich grains are essential for facilitating efficient electron transport and improving the overall conductivity of the material.

As used herein, the term 'conductor-poor grain boundaries' refer to the regions between conductive grains where the concentration of conductive elements is significantly lower, resulting in reduced electrical conductivity. These boundaries can act as barriers to electron flow, limiting the overall conductivity of the material. In certain materials, conductor-poor grain boundaries are used strategically to influence charge storage and distribution, enhancing specific properties like capacitance or stability.

As used herein, the term 'Knop's phenomenological theory' describes the frequency-dependent behavior of dielectric properties, such as dielectric constant (F) and dielectric loss ($\varepsilon''$), in materials. The theory postulates that charge carriers, including electrons and holes, contribute to the polarization of the material. At lower frequencies, charge carriers align more easily with the electric field, leading to higher dielectric constants. As the frequency increases, charge carriers cannot keep up with the oscillating field, resulting in decreased dielectric constant and increased dielectric loss. Electrical conduction is attributed to the hopping mechanism, where electrons and holes move between localized sites. This theory explains the observed frequency dependence of dielectric properties and conductivity in materials.

As used herein, the term 'nanoparticles (NPs)' refers to particles having a particle size of 1 nanometer (nm) to 500 nm within the scope of the present disclosure.

As used herein, the term 'nanocomposite' is a material that is made by combining a matrix (often a polymer, metal, or ceramic) with NPs or nanocomposites to enhance its properties. The NPs are typically on the scale of nm (1 to 100 nm), and their small size and high surface area can significantly improve the composite material's strength, thermal stability, electrical conductivity, optical properties, and other characteristics.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'pore volume' refers to the total volume of void spaces (pores) within a material that are capable of being filled by a gas or liquid. It is typically expressed in cubic centimeters per gram ($cm^3/g$) and is an important parameter in characterizing the porous structure of materials, such as adsorbents or catalysts. As used herein, the term 'pore diameter' refers to the average width or size of the pores (void spaces) within a material, typically measured in nm or angstroms (Å). It is a key parameter in characterizing the texture and permeability of porous materials, influencing their adsorption, filtration, or catalytic properties. Pore diameter is often determined using methods such as nitrogen adsorption or mercury intrusion, which provide insights into the material's ability to absorb or interact with molecules of specific sizes. As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward g-$C_3N_4$@$V_2O_5$/$MgAl_2O_4$ nanocomposites, which have been synthesized using simple methods. As used herein, the term 'g-$C_3N_4$@$V_2O_5$/$MgAl_2O_4$ nanocomposites' refers to a composite material including graphitic carbon nitride (g-$C_3N_4$) functionalized with vanadium pentoxide ($V_2O_5$) and magnesium aluminate ($MgAl_2O_4$). The g-$C_3N_4$@$V_2O_5$/$MgAl_2O_4$ nanocomposite may include electrical and dielectric applications and may be employed for supercapacitors and energy storage. The electrical conductivity values for the nanocomposites increased with increasing frequency, indicating semiconducting behavior. The frequency-dependent variation of dielectric constant (F), dielectric loss ($\epsilon"$), and AC conductivity for the samples has been investigated. It may be observed that both $\epsilon$ and $\epsilon$ decrease with increasing frequency, while AC conductivity increases. The frequency dependence of $\epsilon'$ and $\epsilon$ is explained by Knop's phenomenological theory. Electrical conduction may be attributed to the hopping of electrons and holes.

A nanocomposite is described. The nanocomposite may include graphitic $C_3N_4$, $V_2O_5$, and $MgAl_2O_4$. The mass relationship of graphitic $C_3N_4$, $V_2O_5$, and $MgAl_2O_4$ in the nanocomposite may be in a range of from 5 to 15:2 to 7:75 to 95, preferably 6 to 10:3 to 6:80 to 90, preferably 9 to 11:4 to 6:84 to 86, and more preferably 10:5:85, while tolerable variations of any of these values may be ±2.5, 2, 1.5, 1, 0.75, 0.5, 0.25, 0.1, 0.5, or 0.1. When each component of the nanocomposite is used in desired weight ratios, the nanocomposite exhibits excellent performance in energy production.

The nanocomposite may include g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may include 10±2, 1.5, 1, 0.75, 0.5, 0.25, 0.2, or 0.1 wt. % of graphite-phase carbon nitride (g-$C_3N_4$).

The nanocomposite may include $V_2O_5$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may include 5±1, 0.75, 0.5, 0.25, 0.2, or 0.1 wt. % of $MoO_3$.

The nanocomposite may include magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may include 85±5, 4, 3, 2.5, 2, 1.5, 1, 0.75, 0.5, 0.25, 0.2, or 0.1 wt. % of magnesium aluminum oxide ($MgAl_2O_4$).

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

A Brunauer-Emmett-Teller (BET) specific surface area of the nanocomposite may be in a range of from 25 to 75 square meters per gram ($m^2/g$), preferably 35 to 65 $m^2/g$, preferably 40 to 60 $m^2/g$, and yet more preferably 43.3±5, 4, 3, 2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The pore diameter, pore volume, and BET surface area may be measured by gas adsorption analysis, preferably $N_2$ adsorption analysis (e.g., $N_2$ adsorption isotherms).

The average pore diameter of the nanocomposite, according to Barrett-Joyner-Halenda (BJH) measurement method, may be in a range of from 1 to 10 nm, preferably 2 to 9 nm, preferably 3 to 8 nm, preferably 4 to 7 nm, preferably 5 to 6 nm, preferably 5.66 nm. The nanocomposite may exhibit 5.66±1, 0.75, 0.5, 0.25, 0.2, or 0.1 nm average pore diameter.

The average pore volume of the nanocomposite, according to the BJH measurement method, may be in a range of from 0.01 to 0.5 $cm^3/g$, including subranges such as 0.02 to 0.2 $cm^3/g$, 0.03 to 0.15 $cm^3/g$, 0.04 to 0.11 $cm^3/g$, 0.05 to 0.11 $cm^3/g$, 0.08 to 0.11 $cm^3/g$. The nanocomposite may exhibit an average pore volume of 0.105±0.075, 0.05, 0.025, 0.02, or 0.01 $cm^3/g$.

The average pore distribution of the nanocomposite may include, but is not limited to, crystalline average pore distribution, bimodal, trimodal, multimodal, narrow, broad and Gaussian. The average pore distribution of the nanocomposite may be unimodal. indicating a single dominant pore size within the material. This unimodal distribution suggests that the nanocomposites may possess a relatively narrow pore size range, which can result in more uniform pore structures, enhancing specific properties such as adsorption capacity, catalytic activity, or surface reactivity.

The nanocomposite may have a (111) interplanar spacing in a range of from 0.220 to 0.300 nm, preferably 0.23 to 0.29 nm, preferably 0.24 to 0.28 nm, preferably 0.25 to 0.27 nm, preferably 0.26 nm, according to selected area diffraction. The nanocomposite may have a (400) spinel interplanar spacing in the range of 0.140 to 0.220 nm, preferably 0.15 to 0.21 nm, preferably 0.16 to 0.2 nm, preferably 0.17 to 0.19 nm, preferably 0.18, preferably 0.183 nm, according to selected area diffraction. The nanocomposite may have a (220) interplanar spacing in a range of from 0.105 to 0.195 nm, preferably 0.11 to 0.18 nm, preferably 0.12 to 0.17 nm, preferably 0.13 to 0.16 nm, preferably 0.14 to 0.15 nm, preferably 0.147 nm, according to selected area diffraction. The nanocomposite may have a (620) spinel interplanar spacing in a range of from 0.090 to 0.170, preferably 0.1 to 0.15 nm, preferably 0.1 to 0.13 nm, preferably 0.1 to 0.12 nm, preferably 0.129 nm, according to selected area diffraction.

The nanocomposite may have a (111) interplanar spacing of 0.260±2% nm, a (400) spinel interplanar spacing of 0.183±2% nm, a (220) interplanar spacing of 0.147±2% nm, and a (620) spinel interplanar spacing of 0.129±2% nm, according to selected area diffraction.

The mass relationship of the nanocomposite may be in a range of 9 to 11:4 to 6:84 to 86. The nanocomposite may include 10:5:85, wt. % of the respected components, while tolerable variations of any of these values may be ±5, 4, 3, 2.5, 2, 1.5, 1, 0.75, 0.5, 0.25, 0.1, 0.5, or 0.1.

An XRD spectrum of the nanocomposite may show that the nanocomposite may be crystalline and exhibit a magnesium oxide (MgO) phase, a magnesium aluminum oxide ($MgAl_2O_4$) phase, an $Al_2O_3V_2O_5$ phase, and a graphite-related diffractions. The $V_2O_5$ may be at least 95, 96, 97, 97.5, 98, 99, 99.1, 99.5, or 99.9% dissolved (or completely, e.g., as detectable) within the $MgAl_2O_4$ spinel phase and g-$C_3N_4$ lattice.

The MgO may exist in various phases like cubic, hexagonal, and puckered layers. The $Al_2O_3V_2O_5$ may exist in zircon-type (tetragonal) or monazite-type (monoclinic) structures, or may include a combination thereof. The graphitic carbon nitride (g-$C_3N_4$) may exist in several crystalline phases, including a (alpha), R (beta), y (gamma), and other less-common phases, or mixtures thereof.

$MgAl_2O_4$ may have a spinel phase. The spinel phase may be a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse." The spinel phase with the chemical formula $MgAl_2O_4$ is a mineral type of this oxide family. $MgAl_2O_4$ can be used in various applications, such as in metallurgical, electrochemical, radio-technical, and chemical industrial fields owing to its high thermal stability (melting point at 2135° C.), high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeters ($g/cm^3$)), high thermal shock resistance, hydrophobicity, and low surface acidity.

The XRD spectrum of the nanocomposite under Cu-filtered CuKα radiation (1.5418 Å) powered at 45 kilovolt (kV) and 10 milliampere (mA) may have 2θ peaks of an $MgAl_2O_4$ spinel phase at 18.6±1, 44.9±1, 56.1±1, 59.7±1, and/or 74.7±1°. The XRD spectrum of the nanocomposite under Cu-filtered CuKα radiation (1.5418 Å) powered at 45 kilovolt (kV) and 10 milliampere (mA) may have 2θ peaks of an MgO cubic phase at 37.0±1, 62.6±1, 75.7±1, and/or 79.07±1. The XRD spectrum of the nanocomposite under Cu-filtered CuKα radiation (1.5418 Å) powered at 45 kilovolt (kV) and 10 milliampere (mA) may have 2θ peaks of an $Al_2O_3V_2O_5$ phase at 26.6±1, 34.0±1, 43.1±1, and/or 64.9±1°. The XRD spectrum of the nanocomposite under Cu-filtered CuKα radiation (1.5418 Å) powered at 45 kilovolt (kV) and 10 milliampere (mA) may have 2θ peaks of g-$C_3N_4$-related diffractions at 67.2±1 and/or 79.0±1°.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $TiO_2$, relative to a total metal oxide weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, AlN relative to the total metal oxide weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, $SiO_2$ relative to the total metal oxide weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % AgBr, relative to the total metal oxide weight.

The carbon materials in the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbon nanotubes, relative to total carbon material weight.

The carbon materials in the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbon dots, relative to total carbon material weight.

The carbon materials in the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of graphene oxide, relative to total carbon material weight.

The carbon materials in the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, individually, carbon nanotubes or carbon dots or graphene oxide, relative to total nanocomposite weight. The carbon materials in the nanocomposite include no nanotubes and/or nanorods and/or graphene oxide relative to carbon material weight.

A low concentration of carbon material (carbon nanotubes, carbon dots and graphene oxide) contributes to maintaining the desired structural integrity and functional properties of the nanocomposite. The minimal amount of additional carbon material prevents any significant interference with the performance of the nanocomposite, particularly in applications such as energy storage, where the purity and specific properties are crucial.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state Co, relative to total nanocomposite weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state metal, relative to total nanocomposite weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually, elemental state Co and/or Fe, relative to total nanocomposite weight.

The nanocomposite may include no more than 2.5, 2, 1.5, 1, 0.75, 0.5, 0.1, 0.01, 0.001, 0.0001, or 0.00001 wt. %, preferably 2 wt. %, preferably 1.5 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, Mo, relative to total nanocomposite weight.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, folic acid (or organic (di)acid) relative to total organic weight in the nanocomposite.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, $VO_4$, relative to total vanadium-oxide weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, V-doped ZnO, relative to total nanocomposite weight.

The nanocomposite obtained may include no more than 1, 0.75, 0.5, 0.25, 0.1, 0.01, 0.001, 0.0001, or 0.00001 wt. % of carbonaceous material, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride.

The morphology of the g-$C_3N_4$ may be nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, etc., and mixtures thereof, though any combination of these forms may also be excluded or included. The g-$C_3N_4$ in the nanocomposite may consist essentially of sheet morphologies, i.e., such that no more than 2.5% of the charge capacity of a battery containing the nanocomposite in 5% of the cathode or anode layer is lost relative to a pure nanosheet form.

The purpose of the listed weight percentages in the nanocomposite is to define the specific composition limits and the relative amounts of various materials within the nanocomposite to achieve desired performance characteristics. These restrictions ensure that the nanocomposite maintains its desired properties, such as electrical conductivity, stability, and functionality, without being adversely affected by excessive amounts of other materials.

For example, limiting the amount of $TiO_2$, AlN, $SiO_2$, carbon nanotubes, graphene oxide, and other components may ensure that the nanocomposite retains its intended functionality, such as semiconducting behavior and effective dielectric properties. Additionally, specifying these limits may help maintain the structural integrity of the composite, and/or prevent any adverse effects that might arise from the introduction of too much of certain materials, such as a reduction in conductivity or unwanted chemical interactions.

More specifically, in relation to the synthesis of g-$C_3N_4$@$V_2O_5$/$MgAl_2O_4$ nanomaterials, the weight percentage restrictions define the permissible composition for achieving enhanced electrical conductivity and desired frequency-dependent behavior. These boundaries allow the material to exhibit the desired semiconducting properties, as well as the frequency-dependent variation of dielectric constant and loss, with the electrical conduction mechanism being attributed to the hopping of electrons and holes, as explained by Knop's phenomenological theory. The composition limits thus ensure the material remains within a performance range that supports these characteristics.

Inventive supercapacitors may be charged to any potential within their rated voltage range and can be fully discharged (discharged to 0V), then recharged to full capacity, while batteries are limited by their own chemical reactions to operate in a narrow voltage range (V~½V), and overdischarge may cause permanent damage. Such supercapacitors could have inventive nanocomposites in the electrodes or in an electrolyte between them, which may be solid or liquid.

A method of storing electrical charge using the nanocomposite is described. The method may include charging a capacitor, including an anode and/or a cathode layer including the nanocomposite, with alternating current at a frequency in a range of from 1 to 12 megahertz (MHz), preferably 1.5 to 12 MHz, preferably 2.5 to 12 MHz, preferably 2.75 to 12 MHz, and yet more preferably 3 to 12 MHz. The anode and/or a cathode layer including the nanocomposite, in operation, becomes an electric double-layer of conductor-rich grains separated by conductor-poor grain boundaries. This configuration enhances charge storage efficiency. The anode and/or a cathode layer including the nanocomposite forms an array of homogeneous spherical metal oxides nanoparticles having an average largest diameter in a range of from 7.5 to 12.5 nm, preferably 8 to 12 nm, preferably 9 to 11 nm, preferably 9.1 to 9.5 nm, and yet more preferably 9.4 nm on a porous structured layer including curled and/or wrinkled nanosheets and platelets of the g-$C_3N_4$, enhancing the capacitive performance and enhancing the charge storage capacity of the capacitor. The purpose of forming spherical metal oxide nanoparticles in the anode and/or cathode layer of the nanocomposite is to enhance the capacitive performance and increase the charge storage capacity of the capacitor. The spherical shape of the nanoparticles enhances the material's surface area and facilitates efficient charge distribution and storage. The method does not include sonicating any starting materials in a range of from 1 to 100 kilohertz (kHz). By excluding sonication at these frequencies, the method ensures that the nanocomposite maintains its desired structural integrity and properties without the unwanted influence of ultrasonic-induced effects like excessive heating or cavitation, which can destabilize or agglomerate the nanoparticles.

EXAMPLES

The following examples demonstrate a method of storing electrical charge using a nanocomposite. The examples are provided solely for illustration and are not to be construed as limitations of the present disclosure, as many variations thereof are possible without departing from the spirit and scope of the present disclosure.

Example 1: Fabrication of g-$C_3N_4$@$V_2O_5$/ $MgAl_2O_4$ (10:5:85, wt. %) nanocomposite According to the present disclosure, magnesium nitrate, and aluminum nitrate were added together in one beaker with ammonium metavanadate, in a predetermined amount (here, stoichiometric), to produce a 10% $V_2O_5$@$MgAl_2O_4$ nanocomposite. Further, about 10 grams (g) of methanol, as a fuel, was added to the beaker, followed by 30 milliliters (mL) of distilled water. The beaker was heated till a clear solution was obtained, and heated further till dryness. The obtained product was ground in a mortar, transferred to a 150 mL porcelain dish, and calcined at 700° C. for 3.0 hours. Furthermore, the 10% $V_2O_5$@$MgAl_2O_4$ product was cooled down to room temperature and weighed, ground with urea in an amount suitable (here, 2 g urea to 20 g of the 10% $V_2O_5$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $V_2O_5$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$V_2O_5$/ $MgAl_2O_4$ (10:5:85, wt. %) nanocomposite. The quadruple mixture was returned and heated to 600° C. for 60 minutes in a covered porcelain crucible, and subsequently, the g-$C_3N_4$@$V_{2O5}$/$MgAl_2O_4$ (10:5:85, wt. %) nanocomposite was collected.

Example 2: Characterization

X-ray diffraction (XRD) was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 20=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage.

Example 3: Electrical Measurements

In certain aspects of the present disclosure, a two-probe method to measure an electrical conductivity (EC) of tablets having a diameter of about 10 millimeters (mm) and a thickness of about 1 mm. The tablets were manufactured by pressing powder under a $2\times10^{-3}$ kg/cm$^2$ pressure. Silver paste was placed on both surfaces of each tablet. The tablets were placed in an oven to remove any moisture. The electrical conductivity, dielectric constant, dielectric loss, and impedance were measured, under typical room conditions, using a programmable automatic LCR bridge (model HIOKI IM 3536, Nagano, Japan) at a fixed voltage of about 1.0 V and frequencies between 1000 Hz and 2 MHz. The frequency dependent complex dielectric function may be expressed via Equation 1, as provided hereinafter:

$$\varepsilon^{**}(\omega)=\varepsilon'(\omega)-j\varepsilon''(\omega) \tag{1}$$

where, 'j'=$\sqrt{-1}$, the imaginary part of the permittivity is represented by ε", while the real part is represented by ε'. Further, equation 2 and equation 3 were used to approximate the values for ε' and ε", as provided below:

$$\varepsilon'=Cd/\varepsilon° As \tag{2}$$

$$\varepsilon''(\omega)=\varepsilon'(\omega)\tan\delta \tag{3}$$

where 'ε°' is the free space permittivity about and is equal to 8.86×10$^{-12}$ F/m, 'd' is the thickness, 'As' is the cross-section area, 'Tanδ' is the dissipative factor, 'ω' (2πf) is the electric field frequency.

Results and Discussion

As mentioned above, XRD was used to examine the crystallinity and phase identification of the g-$C_3N_4$@$V_2O_5$/ $MgAl_2O_4$ catalyst, the results are depicted in FIG. 1. The high crystalline nature of the nanocomposite was indicated by sharp peaks and high-intensity values, as shown in FIG. 1. Furthermore, the broad peak shows the small size of particles of the produced nanocomposite. The phases $V_2O_5$, MgO, $MgAl_2O_4$, and g-$C_3N_4$ are identified by analyzing the diffraction patterns with the standard COD cards. The $MgAl_2O_4$ spinel phase was successfully identified by diffraction that was present at the 2.6 values of 18.6°, 44.9°, 56.1°, 59.7°, and 74.7° (COD No. 9002136). The corresponding designs for these diffractions are (111), (400), (422), (511), and (620). The cubic phase of MgO was found at 2θ values of 37.0°, 62.6°, 75.7°, and 79.070 (PDF card, No. 1011118). These diffractions originated from plans (111), (220), (311), and (222), respectively. It has also been previously observed that MgO is present along with the $MgAl_2O_4$ spinel phase. In addition, the peak at 34.1° related to $Al_2O_3V_2O_5$, was represented by diffractions at 2.6 values of 26.6°, 34.0°, 43.10, and 64.9° (COD No. 00-4124511). The emergence of weak $V_2O_5$ diffraction suggests that the $V_2O_5$ may have completely dissolved within the spinel and g-$C_3N_4$ lattices. g-$C_3N_4$-related diffractions were detected at 67.2° and 79.0° (COD No. 1534042).

Figure 2A:
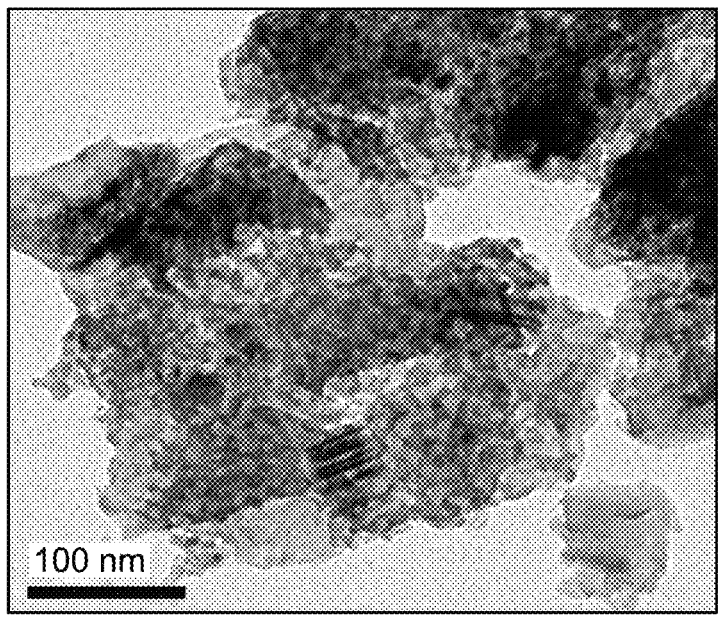
FIG. 2A is a transmission electron microscopy (TEM) image of an inventive 10% g-$C_3N_4$@$V_2O_5$/$MgAl_2O_4$ nanocomposite.
Figure 2B:
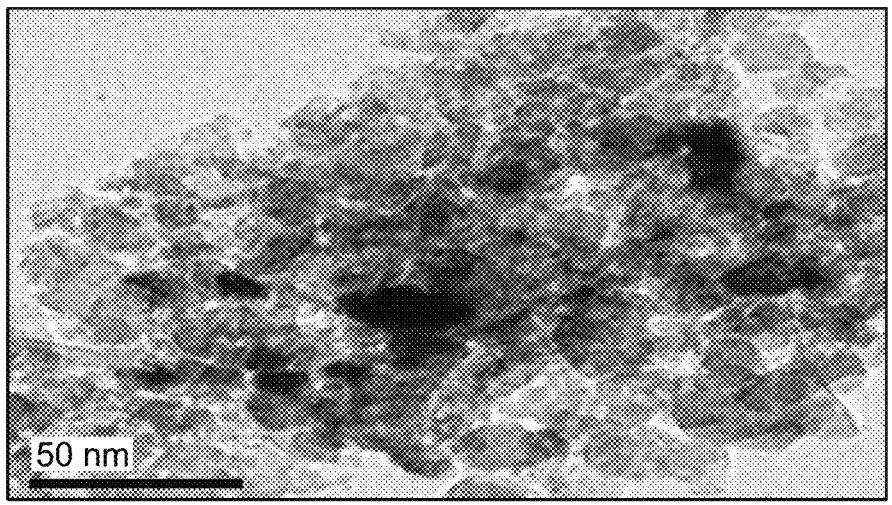
FIG. 2B is another TEM image of an inventive 10% g-$C_3N_4$@$V_2O_5$/$MgAl_2O_4$ nanocomposite, at a magnification of 50 nanometers (nm).
Figure 2C:
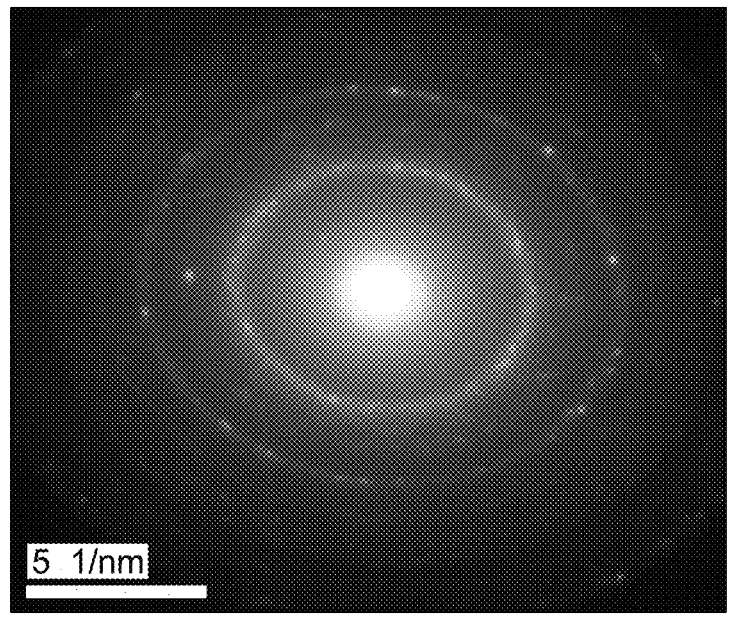
FIG. 2C is a selected area electron diffraction (SAED) pattern of an inventive 10 g-$C_3N_4$@$V_2O_5$/$MgAl_2O_4$ nanocomposite.
Figure 2D:
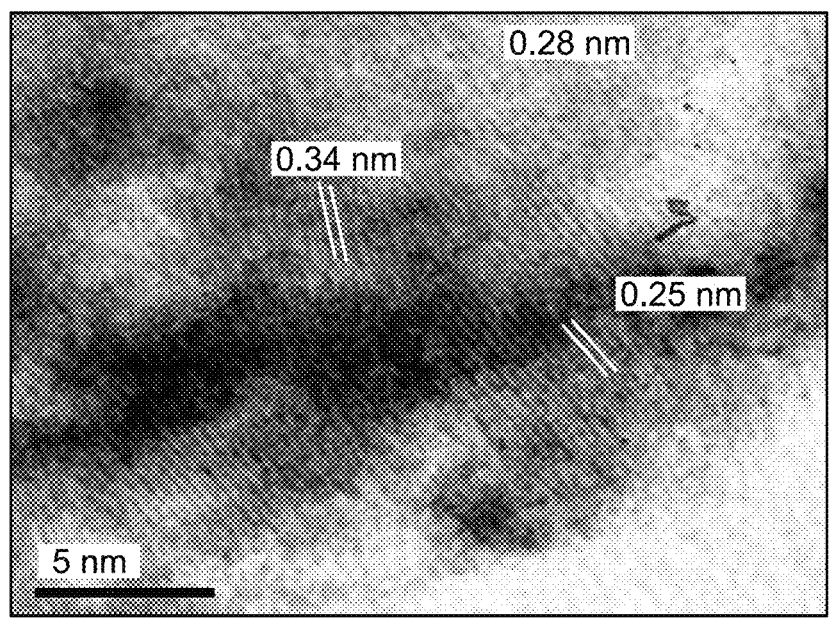
FIG. 2D is a high-resolution transmission electron microscopy (HRTEM) image of an inventive 10% g-$C_3N_4$@$V_2O_5$/$MgAl_2O_4$ nanocomposite.
Figure 2E:
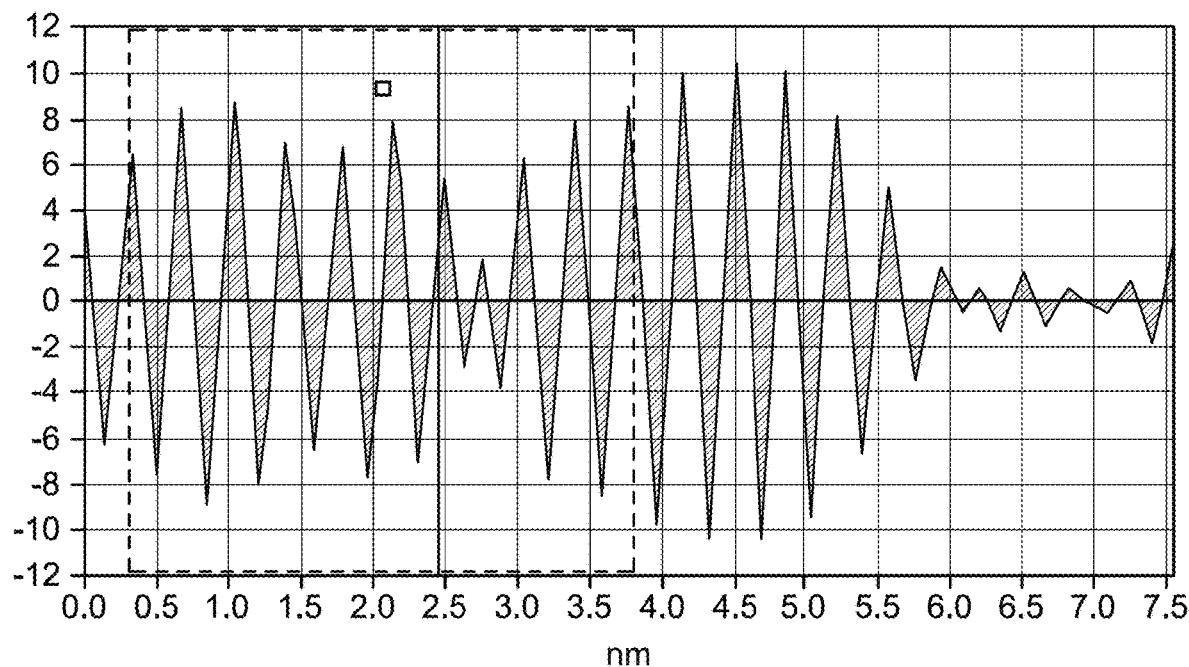
FIG. 2E is a fast Fourier transform (FFT) spectra of an inventive 10% g-$C_3N_4$@$V_2O_5$/$MgAl_2O_4$ nanocomposite.
Figure 2F:
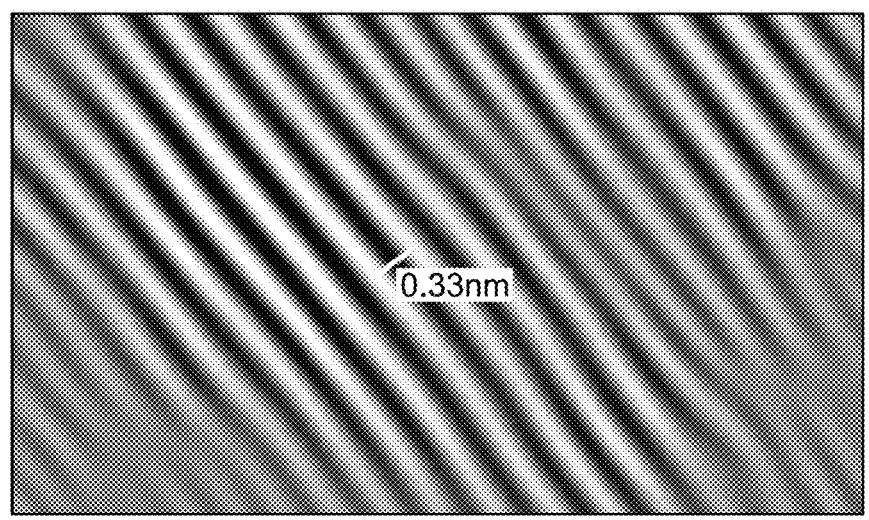
FIG. 2F is an inverse fast Fourier transform (IFFT) spectra of an inventive 10% g-$C_3N_4$@$V_2O_5$/$MgAl_2O_4$ nanocomposite.

Further, TEM images of g-$C_3N_4$@$V_2O_5$/$MgAl_2O_4$ nanocomposite are shown in FIGS. 2A-2B. The TEM images show the well dispersion of homogeneous spherical metal oxides nanoparticles with a size of about 9.4 nm on two-dimensional porous structure constructed with curled and wrinkled nanosheets and platelets of the g-$C_3N_4$. The corresponding SAED pattern, shown in FIG. 2C, reveals diffraction spots with interplanar spacing of 0.260 nm, 0.183 nm, 0.147 nm, and 0.129 nm, due to (111, $V_2O_5$), (400, spinel), (220, MgO), and (620, spinel) diffraction planes, respectively. The corresponding HRTEM of the nanocomposite, depicted in FIG. 2D, shows a plane spacing of 0.34 nm related to the (002) of CN, where 0.28 nm relates to (220) plane of spinel and 0.262 nm relates to (111) plane of $V_2O_5$, respectively, characterizing the heterostructure formation. The fast Fourier transform (FFT) and inverse fast Fourier transform (IFFT) measurements, as depicted in FIG. 2E and FIG. 2F, show a 'd' value of about 0.33 nm given to g-$C_3N_4$@$V_2O_5$/$MgAl_2O_4$ nanocomposite, signifying the lattice spacing of (002), indicating the development of g-$C_3N_4$ structure.

Figure 3:
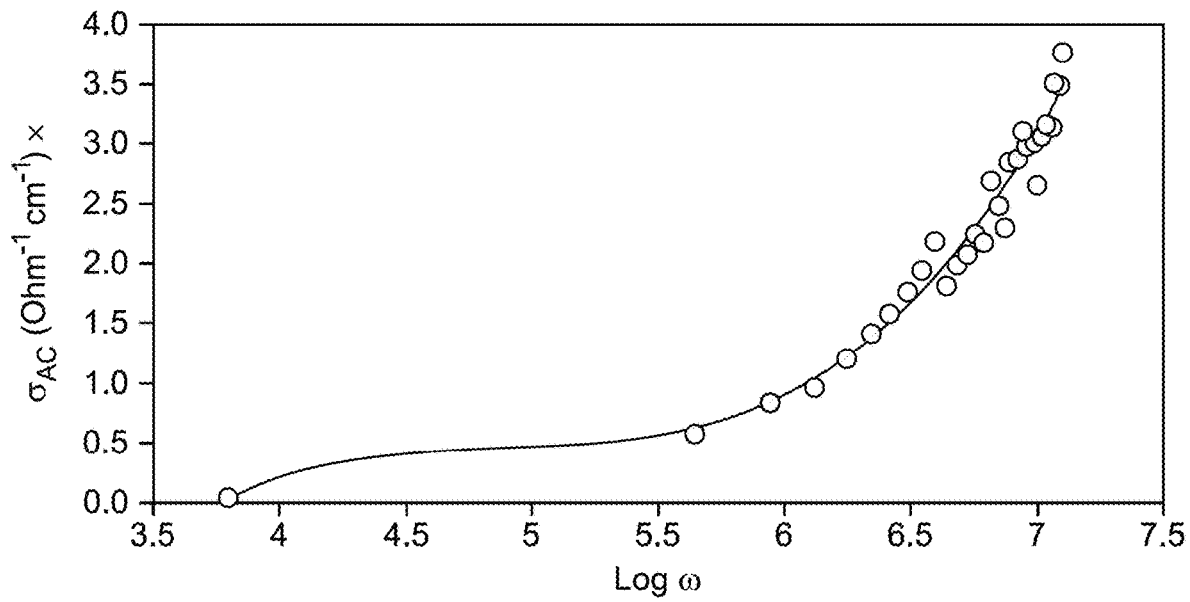
FIG. 3 is a graph depicting an influence of frequency on the AC conductivity of an inventive 10% g-$C_3N_4$@$V_2O_5$/$MgAl_2O_4$ nanocomposite.

Further, in general, the AC method distinguishes between several mechanisms, such as electrode response, grain boundary conduction, and grain conduction, that contribute to an overall conductivity of a material. The AC conductivity frequency dependence for the g-$C_3N_4$@$V_2O_5$/$MgAl_2O_4$ nanocomposite, at room temperature, is shown in FIG. 3.

Furthermore, equation 4 is utilized to determine the ac conductivity of every sample:

$$\sigma_{AC} = \varepsilon^\circ \varepsilon' \omega \tan \delta \qquad (4)$$

where '$\varepsilon^\circ$' is the vacuum permittivity, '$\varepsilon'$' is the dielectric constant, and 'tan $\delta$' depicts the loss tangent. As can be seen from FIG. 3, the AC conductivity increases with frequency, specifically at higher frequencies, since high frequency delivers a bigger pumping power to charge carriers, subsequently, the AC conductivity is highest at higher frequencies, as described by Rao et al. in *J. Mater. Sci.* 1997, 32, 6049e54, which is incorporated by reference herein. An increase in the hopping rate of charge between the charge carriers is sufficient to improve conductivity without increasing the number of charge carriers.

According to present disclosure, the behavior of the nanocomposite as a multilayer capacitor of grains and grain boundaries, as predicted by the Koops model may be able to explain the increase in AC conductivity with temperature and frequency, as described by Sivakumar and coworkers in *J. Korean Ceram. Soc.* 2018, 55, 230e8, which is incorporated by reference herein. A practically continuous plateau area was seen at lower frequencies where the resistive grain boundaries were more active and prevent electronic charge carriers from hopping between such boundaries. However, the conductive grains were more active at higher frequencies, allowing charge carriers to hop between neighboring ions.

The release of charge carriers trapped in small areas may lead to a rise in high-frequency conductivity, an increase in the force of the applied field, and increased migration and movement of the released charge carriers in different directions. Significant elements in the conduction of material behavior include liberated charge carriers and electron mobility among many metal ions, as described by Ahmed, et al. in *Mater. Lett.* 2003, 57, 4256-4266, which is incorporated by reference herein. Materials used in semiconductors have the following frequency-dependent relationship, as depicted by equation 5:

$$\sigma_{AC}(\omega) = A\omega^s \qquad (5)$$

where 'A' and 's' are constants.

Figure 4:
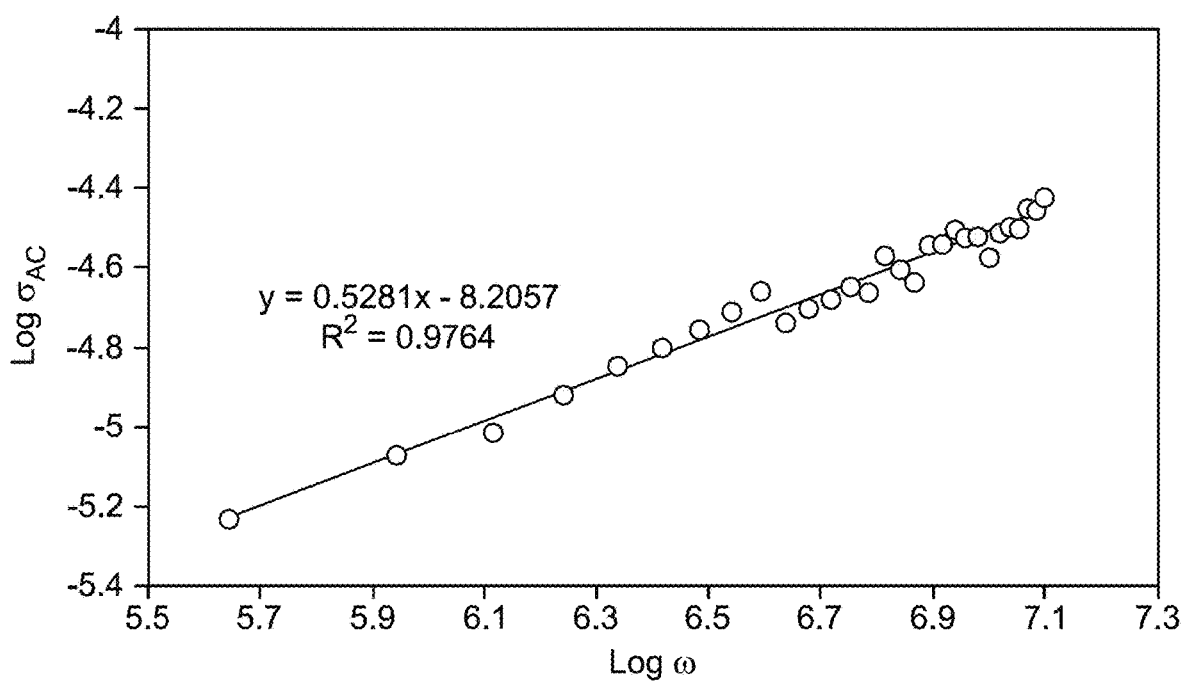
FIG. 4 is a graph depicting frequency dependence if AC conductivity of an inventive 10% g-$C_3N_4$@$V_2O_5$/$MgAl_2O_4$ nanocomposite.

A sudden hopping of the charge carriers results in translational motion if 's' less than 1, while a localized hopping of the species is indicated when 's' is more than 1, as described by Sen, et al. *Mater. Chem. Phys.* 2004, 87, 256-263, which is incorporated by reference herein. The effect is caused by the relaxation resulting from the movement of electrons or atoms by tunneling or hopping between equilibrium locations. The exponent 's' is determined by graphing the natural logarithm of '$\sigma_{AC}(\omega)$' against the natural logarithm of '$(\omega)$', as depicted in FIG. 4. The value of 's' was found to be around 0.528, indicating that correlated barrier hopping (CBH) is the most likely mechanism in the g-$C_3N_4$@$V_2O_5$/$MgAl_2O_4$ nanocomposite. In general, the relation between the conduction mechanism and s(f) behavior might suggest a suitable model of the conduction mechanism.

Figure 5:
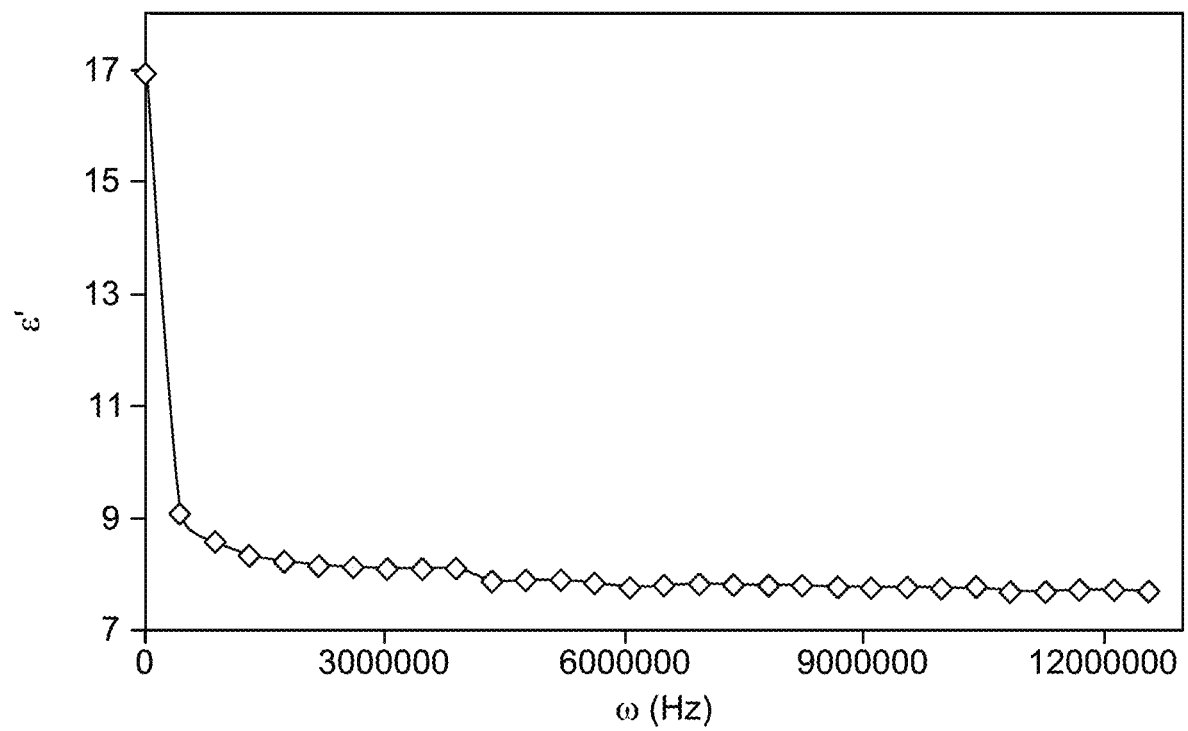
FIG. 5 is a graph depicting frequency dependence of dielectric constant of an inventive g-$C_3N_4$@$V_2O_5$/$MgAl_2O_4$ nanocomposite.

The frequency dependence of the '$\varepsilon'$' for the g-$C_3N_4$@$V_2O_5$/$MgAl_2O_4$ nanocomposite at room temperature, is depicted in FIG. 5. In particular, FIG. 5 shows a dispersion in $\varepsilon'$ values as the frequency increases. At lower frequencies, the decline in $\varepsilon'$ value occurs very quickly, whereas at higher frequencies, approaching a constant value takes longer. In general, charge polarization is the storage of some energy in a substance when it is exposed to an external electric field. The stored energy is represented by the real component (F') of the dielectric constant. As mentioned above, FIG. 5 illustrates the effect of frequency on the dielectric constant $\varepsilon'$ of the examined materials at specific temperatures. The graph, as depicted in FIG. 5, indicates that for the nanocomposite, $\varepsilon'$ drops with increasing frequency. At lower frequencies, the decline was swift, while at higher frequencies, the decline was more gradual. The observed dielectric behavior may be explained by the hopping process and the idea of polarization, as described by Kambale et al. in *Smart Mater. Struct.* 2009, 18, 085014, which is incorporated by reference herein.

The nanocomposite was presumed to be arranged of distinctive structures or regions (grain and grain boundaries) and the conductivity of the grain was higher than the grain boundary. Therefore, it is appropriate to say that the higher dielectric constant values were obtained from the charge accumulation at the grain boundaries.

In general, according to the Koops theory, the interfacial polarization of the Maxwell-Wagner type may be used to analyze the dielectric dispersion curves, as described by Melagiriyappa et al. in *Mater. Chem. Phys.* 2008, 112, 68e73, which is incorporated by reference herein. The aforementioned models predict that the nanocomposite may include conductor rich grains separated by conductor-poor grain boundaries. The grain boundaries are more effective at low frequencies, whereas grains are more effective at higher frequencies.

Figure 6:
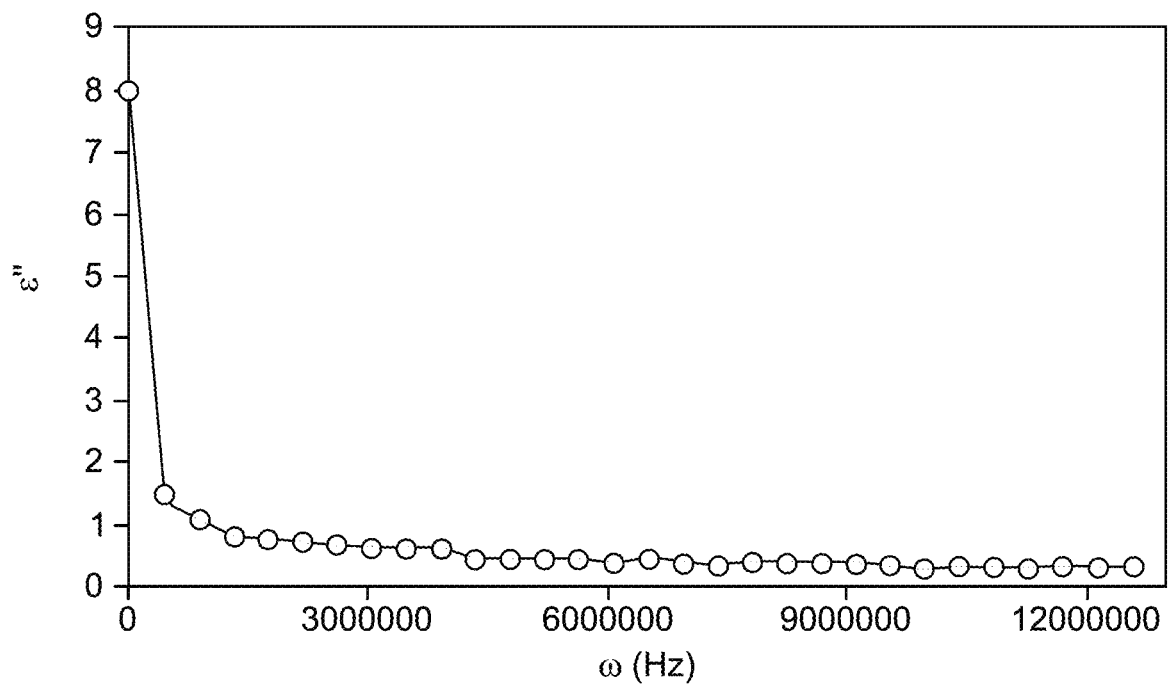
FIG. 6 is a graph depicting frequency-dielectric loss ($\varepsilon''$) correlation for an inventive g-$C_3N_4$@$V_2O_5$/$MgAl_2O_4$ nanocomposite.

Further, the dielectric loss factor ($\varepsilon''$) specifies the quantity of energy lost due to charge carrier movement. The fluctuation of $\varepsilon''$ as a function of frequency for g-$C_3N_4$@$V_2O_5$/$MgAl_2O_4$ nanocomposite at room temperature is shown in FIG. 6. The behavior obtained is comparable to that of the real part of the dielectric constant, as such, it decreases as the frequency increases. The $\varepsilon''$ value rapidly drops in the low-frequency region while remaining low in the high-frequency region. The observed trend may be elucidated by the fact that in the low-frequency region where the samples possess higher resistivity (because of the grain boundary), additional energy is needed to hop the charges between the cations, and thus, the loss is high. In the high-frequency region, where the samples have low resistivity (due to grains), less energy is involved in hopping the charges between the cations at the octahedral sites. The polarization of space charges may potentially cause a decrease in dielectric loss as the frequency increases.

Figure 7:
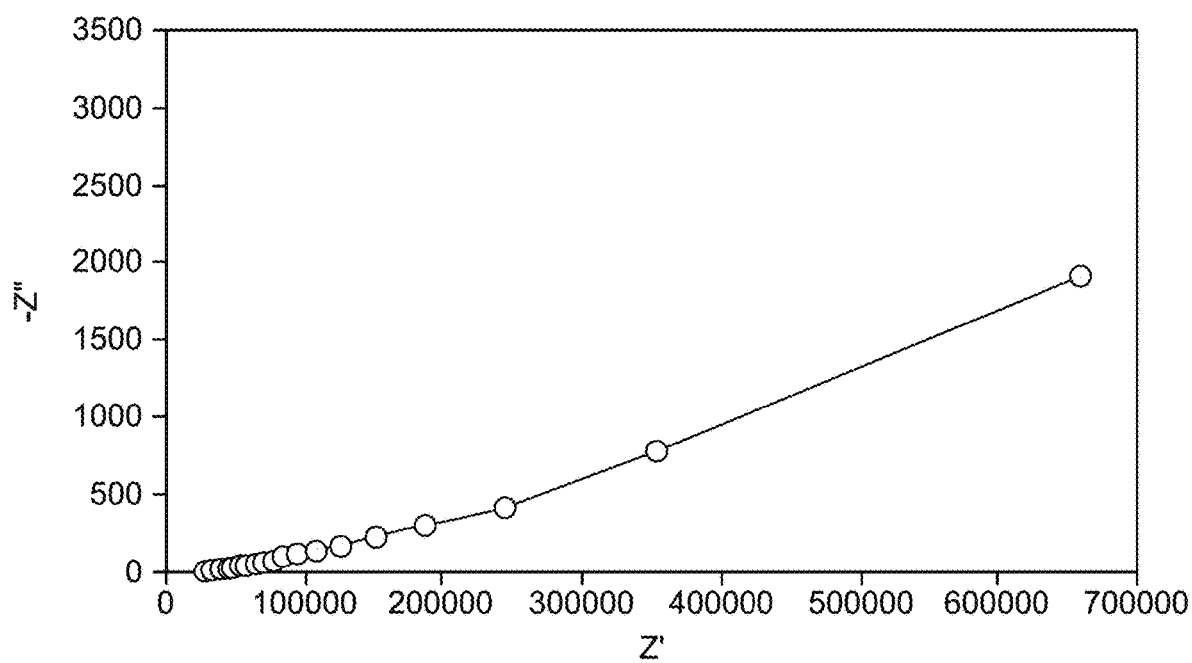
FIG. 7 shows Nyquist ($Z''$—$Z'$) plots of an inventive g-$C_3N_4$@$V_2O_5$/$MgAl_2O_4$ nanocomposite, at room temperature.

In general, impedance spectroscopy is a practical and effective method for establishing the relationship between the electrical characteristics and microstructures of substrates. Generally, the electrochemical impedance spectroscopy (EIS) spectra show distinct semicircles in complex impedance planes as they possess diverse relaxation times. The impedance responses caused by the grain border and the grain itself may overlap if the variation in time constants among the processes is less than one hundred. FIG. 7 depicts the complex impedance spectra for the g-$C_3N_4$@$V_2O_5$/$MgAl_2O_4$ nanocomposite, from which it can be observed that the complex impedance spectrum shows single depressed semicircle in the complex impedance plots at 303, as described by Moguš-Milanković and coworkers in *J. Phys. Chem. B* 2016, 120, 3978-3987, which is incorporated by reference herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of storing electrical charge, the method comprising:
   charging a capacitor, comprising an anode and/or a cathode layer comprising a nanocomposite comprising graphitic $C_3N_4$, $V_2O_5$, and $MgAl_2O_4$ in a mass relationship to each other in a range of from 5 to 15:2 to 7:75 to 95, with alternating current at a frequency in a range of from 1 to 12 MHz.

2. The method of claim 1, wherein the average pore distribution of the nanocomposite is unimodal, and
   wherein a BET specific surface area of the nanocomposite is in a range of from 25 to 75 $m^2/g$, and/or
   wherein an average pore diameter of the nanocomposite, according to BJH measurement method, is in a range of from 1 to 10 nm, and/or
   wherein an average pore volume of the nanocomposite, according to the BJH measurement method, is in a range of from 0.01 to 0.5 $cm^3/g$.

3. The method of claim 1, wherein the nanocomposite has a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and a (620) spinel interplanar spacing in a range of from 0.090 to 0.170, according to selected area diffraction.

4. The method of claim 1, wherein the mass relationship of the nanocomposite is in a range of from 9 to 11:4 to 6:84 to 86,
   wherein the nanocomposite has a (111) interplanar spacing of 0.260±2% nm, a (400) spinel interplanar spacing of 0.183±2% nm, a (220) interplanar spacing of 0.147±2% nm, and a (620) spinel interplanar spacing of 0.129±2% nm, according to selected area diffraction,
   wherein an XRD spectrum of the nanocomposite under Cu-filtered CuKα radiation (1.5418 Å) powered at 45 kV and 10 mA has 20 peaks of
   an $MgAl_2O_4$ spinel phase at 18.6±1, 44.9±1, 56.1±1, 59.7±1, and 74.7±1°,
   an MgO cubic phase at 37.0±1, 62.6±1, 75.7±1, and 79.07±1°,
   an $Al_2O_3V_2O_5$ phase at 26.6±1, 34.0±1, 43.1±1, and 64.9±1°, and
   g-$C_3N_4$-related diffractions at 67.2±1 and 79.0±1°, and
   wherein the $V_2O_5$ is at least 95% dissolved within the $MgAl_2O_4$ spinel phase and g-$C_3N_4$ lattice, as detected in the XRD spectrum.

5. The method of claim 1, wherein the charging is at a frequency in a range of from 3 to 12 MHz,
   wherein the anode and/or a cathode layer comprising the nanocomposite, in operation, becomes an electric double-layer of conductor-rich grains separated by conductor-poor grain boundaries, and
   wherein the anode and/or a cathode layer comprising the nanocomposite forms an array of homogeneous spherical metal oxides nanoparticles having an average largest diameter in a range of from 7.5 to 12.5 nm on a porous structured layer comprising curled and/or wrinkled nanosheets and platelets of the g-$C_3N_4$.

6. The method of claim 1, wherein the nanocomposite comprises no more than 10 wt. % of $TiO_2$, relative to a total metal oxide weight.

7. The method of claim 1, wherein the nanocomposite comprises no more than 1 wt. % of AlN, relative to a total metal oxide weight.

8. The method of claim 1, wherein the nanocomposite comprises no more than 1 wt. % $SiO_2$, relative to a total metal oxide weight.

9. The method of claim 1, wherein, relative to total carbon material weight, carbon materials in the nanocomposite comprise
   no more than 1 wt. % carbon nanotubes,
   no more than 1 wt. % graphene oxide, and
   no more than 1 wt. % carbon dots.

10. The method of claim 1, wherein the nanocomposite comprises no more than 1 wt. % AgBr, relative to a total metal oxide weight.

11. The method of claim 1, wherein the nanocomposite comprises no more than 1 wt. % Co, relative to total nanocomposite weight.

12. The method of claim 1, wherein the nanocomposite comprises no more than 1 wt. % elemental state metal, relative to total nanocomposite weight.

13. The method of claim 1, wherein the nanocomposite comprises no more than 1 wt. %, individually, elemental state Co and/or Fe, relative to total nanocomposite weight.

14. The method of claim 1, which does not comprise sonicating any starting materials in a range of from 1 to 100 kHz.

15. The method of claim 1, wherein the nanocomposite comprises no more than 10 wt. % folic acid, relative to total organic weight in the nanocomposite, and
   wherein the nanocomposite comprises no more than 2.5 wt. % Mo, relative to total nanocomposite weight.

16. The method of claim 1, wherein the nanocomposite obtained comprises no more than 1 wt. % carbonaceous material besides the graphitic carbon nitride, and
   wherein carbon materials in the nanocomposite comprise no nanotubes, relative to total nanocomposite weight.

17. The method of claim 1, wherein the nanocomposite comprises no more than 10 wt. % $VO_4$, relative to total vanadium-oxide weight, and
   wherein the nanocomposite comprises no more than 1 wt. % V-doped ZnO, relative to total nanocomposite weight.

18. The method of claim 1, wherein the nanocomposite comprises no more than 10 wt. %, individually, relative to total metal content, of Zn, Ce, Gd, La, Ba, Ti, Ca, Sr, Zr, Pb, Ni, Ag, Pt, Co, Cu, Mn, Cd, Ta, Nb, Pr, and Bi, and
   wherein the nanocomposite comprises no more than 1 wt. %, individually, relative to total carrier weight, of $LiCoO_2$, $SiO_2$, $TiO_2$, ZnO, and ZnS.

19. The method of claim 1, wherein the graphitic $C_3N_4$ in the nanocomposite consists essentially of sheet morphologies, and/or
   wherein the graphitic $C_3N_4$ in the nanocomposite comprises no more than inevitable traces of boron and no more than inevitable nitrogen vacancies.

20. The method of claim 1, wherein the nanocomposite has no more than 0.1 wt. %, individually, of $2MgO \cdot V_2O_5$ or $Na_2Ti_3O_7$, relative to total nanocomposite weight, and
   wherein of the $V_2O_5$ present in the nanocomposite no more than 0.1 wt. % is in liquid phase.

* * * * *